Patented Jan. 23, 1951

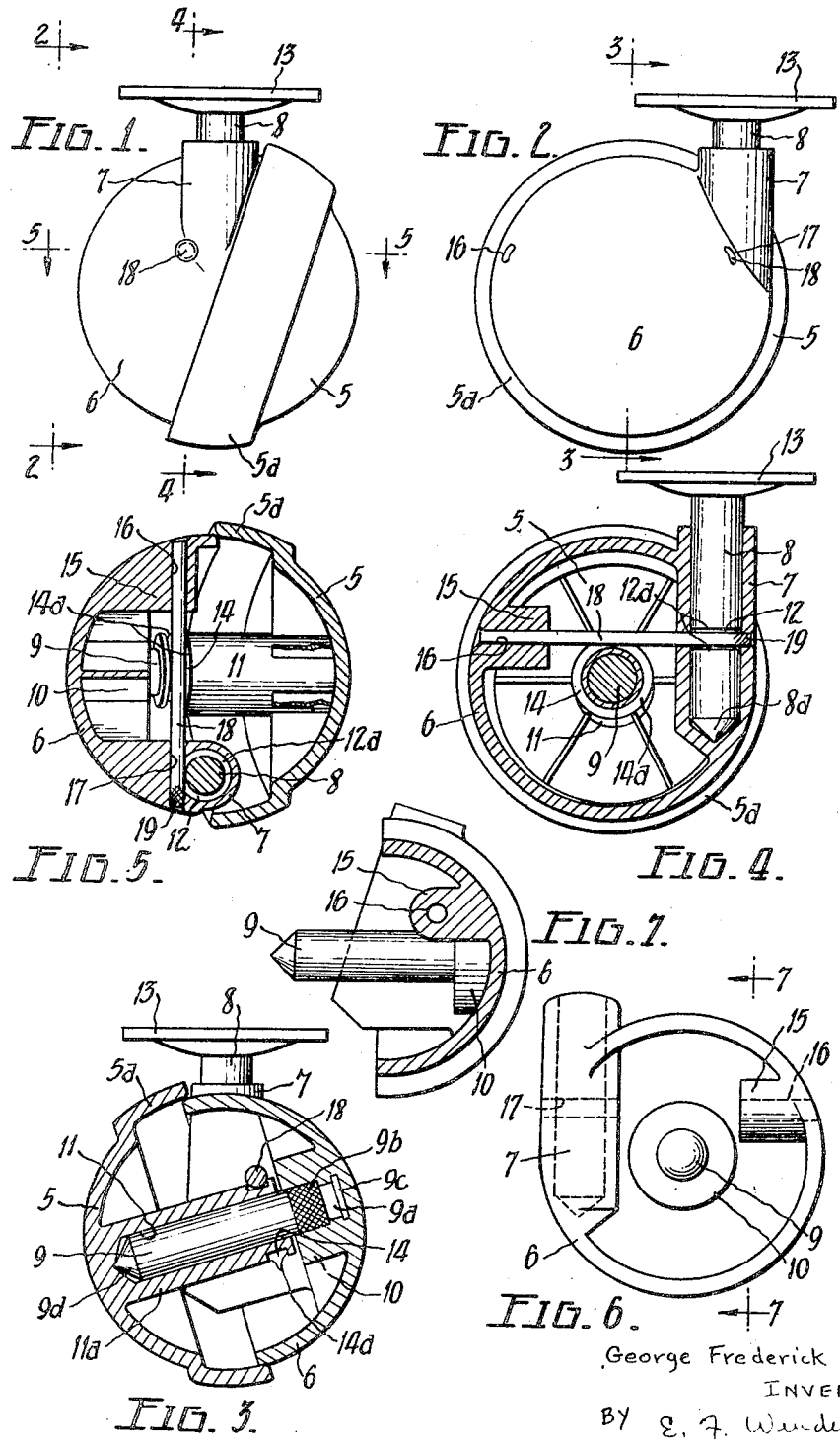

2,539,108

UNITED STATES PATENT OFFICE 2,539,108

CASTER

George Frederick Shepherd, Brighton, Victoria, Australia

Application August 13, 1948, Serial No. 44,165
In Australia September 10, 1947

6 Claims. (Cl. 16—18)

This invention relates to casters of the type having a rotary floor engaging element rotatably mounted on an inclined axle offset from and turnable about the vertical swivel axle of the caster.

As one example of the above type of caster there is disclosed in the complete specification of the applicant's Australian Application No. 15663/44, and in United States Application No. 613,138, filed August 28, 1945, now Patent No. 2,484,189, issued October 11, 1949, a caster consisting of a hollow spherical shell formed of two complementary hemispherical sections, one of which sections is relatively fixed and the other is rotatable and comprises a floor-engaging roller, a vertical swivel axle depending into the hollow spherical shell to permit angular movement of the latter about the former, and an inclined axle upon which the floor-engaging roller is mounted, said axle offset from and turnable about the vertical swivel axle.

The principal objective of the present invention is to provide an improved caster of the type above specified having fewer component parts with attendant simplification in construction and cost reduction in the production of the casters.

In achieving the above-stated principal objective and according to the invention, a caster of the type specified comprises a relatively fixed section forming a body member having the inclined axle secured therein and an integral bearing for the vertical swivel axle, and a single retaining member insertable through the body member upon assembly of the latter and the rotary floor-engaging element upon the respective axles so as to retain the same in assembled relation.

Conveniently, in the preferred arrangement, the body member and the rotary floor-engaging element are of hollow hemi-spherical formation, and the hemi-spherical rotary floor engaging element is provided with a circumferential marginal enlargement, which comprises a floor engaging band or rim within which the edge of the hemispherical body member is concealed.

The accompanying drawings depict a practical arrangement of the caster according to the invention.

In these drawings:

Fig. 1 is a side elevation of the caster.

Fig. 2 is an elevation of the caster as viewed from the line 2—2 of Fig. 1.

Fig. 3 is a vertical section on the line 3—3 of Fig. 2.

Fig. 4 is a vertical section on the line 4—4 of Fig. 1.

Fig. 5 is a sectional plan on the line 5—5 of Fig. 1.

Fig. 6 is an elevation of a component of the caster shown separately.

Fig. 7 is a vertical section on the line 7—7 of Fig. 6.

Referring now to the accompanying drawings the caster comprises a rotary floor engaging roller 5 in the form of a flanged hemispherical section, and a relatively fixed and complementary hollow hemispherical section or body member 6, the sections 5—6 forming in assembly a hollow substantially spherical shell as viewed in Figs. 1 and 2.

The flange 5a of the rotary roller 5 comprising a spherical segmental section inclined relatively to the vertical axis of the complete sphere is of enlarged diameter to engage the floor. The relatively fixed section 6 has formed integrally therein along one end or side a deep tubular recess 7 constituting a bearing in which the vertical swivel axle 8 of the caster is mounted. The inner end of the bearing 7 is conical to receive the apex of the conical end 8a upon the swivel axle 8 which is offset to and disposed upon one side of the inclined axle 9 of the rotary roller as viewed in Fig. 4.

The inclined axle 9 of the rotary roller 5 is diametrically arranged as illustrated in Fig. 3, one end being fixed as by casting in an integral centrally disposed boss 10 in the fixed section 6 of the caster.

In order to secure the axle 9 in the boss 10 by casting, the former is provided with a circumferential groove 9a, a knurled band 9b and a flange 9c formed by the groove 9a, (see Figure 3). In the process of casting, the metal fills the groove 9a and engages the knurled band 9b, so that upon cooling, the axle is firmly secured against rotation by the knurled band and against axial movement by the metal in the groove 9a and the metal surrounded flange 9c.

A centrally disposed bearing 11 is formed in the rotary roller 5 by the integral hollow boss 11a and the axle 9 in assembly fits within the bearing 11, which latter is disposed in alignment with and extends nearly to the boss 10 in the body member 6 of the caster as illustrated in Fig. 3.

The disposition of the axle 9 is such that it is inclined to a plane normal to the vertical swivel axle 8 of the caster. The inner end of the bearing 11 is of conical form to receive the apex of the tapered end 9d of the axle 9 to provide for the thrust upon the axle 9.

The swivel axle 8 is formed with a circumferential groove 12 located to lie within the bearing 7 and provide spaced annular shoulders 12a in the axle 8 which at the upper end carries an attachment plate 13 whereby the caster is fixed to furniture.

In alignment with the circumferential groove 12 the bearing 11 of the rotary roller 5 is formed with a similar groove 14 providing spaced annular shoulders 14a (see Figs. 4 and 5).

Within the relatively fixed section or body member 6 of the caster, is formed oppositely to the swivel bearing 7 an apertured boss 15, the aperture 16 therein being disposed in alignment with the circumferential grooves 12 and 14, and an aligning aperture 17 in the bearing 8. The aligning apertures 16—17 and grooves 12—14 permit a keeper pin 18 to be driven through the relatively fixed section 6 to pass in tangential disposition through the grooves 12—14 and between the annular shoulders 12a and 14a of the axle 8 and bearing 11 as illustrated in Figs. 4 and 5.

The keeper pin 18 thus retains the relatively fixed sections 6 and rotary roller 5 and the axles 8—9 in assembly. The keeper pin 18 is preferably knurled at one end 19, but may be arcuately shaped or bent whereby on being driven into the assembled position described the knurl or alternatively the resiliency of the bent pin upon straightening will retain the latter in operative position.

A caster as above described may be constructed in relatively small sizes and the small number of component parts comprising the vertical swivel axle, body portion or relatively fixed section, the inclined axle and floor engaging roller, achieves economy in manufacture and assembly.

Moreover, the floor-engaging roller and integral bearing and the body member having the bearing for the swivel axle and boss with the inclined axle secured therein as described, are adapted for manufacture in quantity by pressure or die-casting.

I claim:

1. A caster for furniture and the like, comprising a cylindrical pivot member fixable to and dependent from an article to be supported, a circumferential groove in the periphery of the cylindrical pivot member, a body member mounted upon and angularly movable about the cylindrical pivot member, an axle secured to the body member and disposed inclinably in a plane parallel with said pivot member, a bearing in the body member spaced from the axle and accommodating the cylindrical pivot member, a rotary floor-engaging element having a hub, said hub rotably fitting the axle, a circumferential groove in the periphery of the hub, and a retaining member detachably fixed in the body member and engaging the circumferential grooves to main the body member in engagement with said pivot member and the floor-engaging element on the axle.

2. A caster for furniture and the like, comprising a hemispherical shell forming the body member of the caster, a bearing integral with the hemispherical shell the axis of which is inclined to the axis of said shell, a cylindrical stem fixable to an article to be supported and rotatably fitting the bearing, a circumferential groove in the periphery of the cylindrical stem, an axle secured to the hemispherical shell and disposed coincidently with the axis thereof, a complementary spherical shell comprising a rotary floor-engaging element disposed coaxially with the hemispherical shell forming the body member, a hub integral with the complementary spherical shell and rotatably fitting the axle, a circumferential groove in the periphery of the hub, and a retaining member carried by the hemispherical shell forming the body member and engaging said grooves to maintain said shell or body member engaged with the cylindrical stem and the complementary spherical shell on the axle.

3. A caster for furniture and the like as claimed in claim 2, wherein said hemispherical shell has aligned apertures formed in opposite sides thereof and said circumferential grooves are disposed in alignment each with the other and in alignment with said apertures, and a retaining pin extending through and engaging in the aligned grooves.

4. A caster for furniture and the like comprising a pivot member fixable vertically to an article to be supported, a body member rotatably mounted on the pivot member, an axle secured to the body member and spaced from and inclinably related to the pivot member, a rotary floor engaging element having a hub rotatably fitting the axle, said pivot member and hub each having an annular shoulder, and a retaining member extending through the body member in co-operative relationship with the annular shoulders for maintaining the body member in engagement with the pivot member and the rotary floor engaging element on the axle.

5. A caster for furniture and the like comprising a pivot member fixable vertically to an article to be supported, a body member rotatably mounted on the pivot member, an axle secured to the body member and spaced from and inclinably related to the pivot member, a rotary floor engaging element having a hub rotatably fitting the axle, said pivot member and hub each having a circumferential groove therein, and a retaining member extending transversely through the body member and engaging the circumferential grooves to maintain the body member in engagement with the pivot member and the rotary floor engaging element on the axle.

6. A caster for furniture and the like comprising a pivot member fixable vertically to an article to be supported, a body member rotatably mounted on the pivot member, an axle secured to the body member and spaced from and inclinably related to the pivot member, a rotary floor engaging element having a hub rotatably fitting the axle, said pivot member and hub each having a circumferential groove therein aligned each with the other, and a retaining pin detachably fixed to and extending through the body member and engaging in the aligned grooves to maintain the body member in engagement with the pivot member and the rotary floor engaging element on the axle.

GEORGE FREDERICK SHEPHERD.

REFERENCES CITED

The following references are of record in the file of this patent:

UNITED STATES PATENTS

| Number | Name | Date |
|---|---|---|
| 309,273 | Whitney | Dec. 16, 1884 |